Nov. 20, 1962   W. H. DEVONSHIRE ETAL   3,064,586
TROLLEY CONVEYOR SWITCH MECHANISMS
Filed May 19, 1959   13 Sheets-Sheet 1
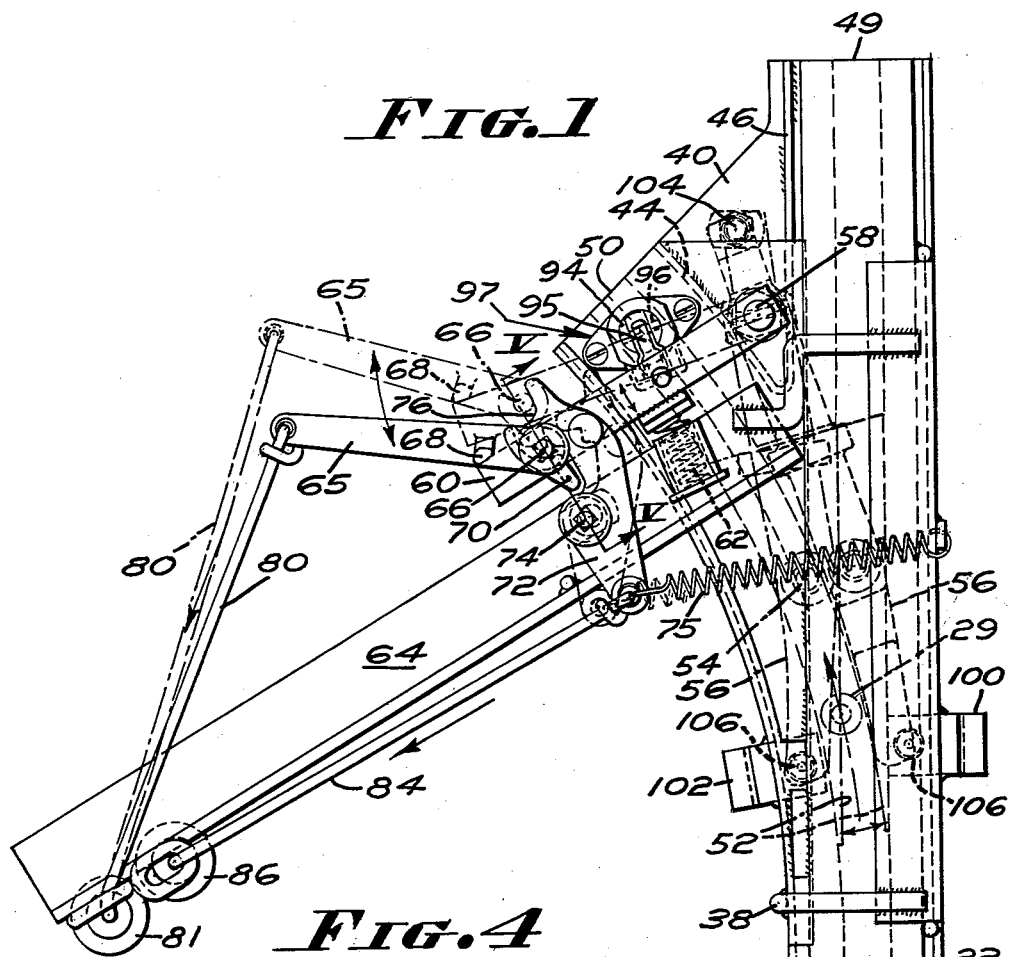
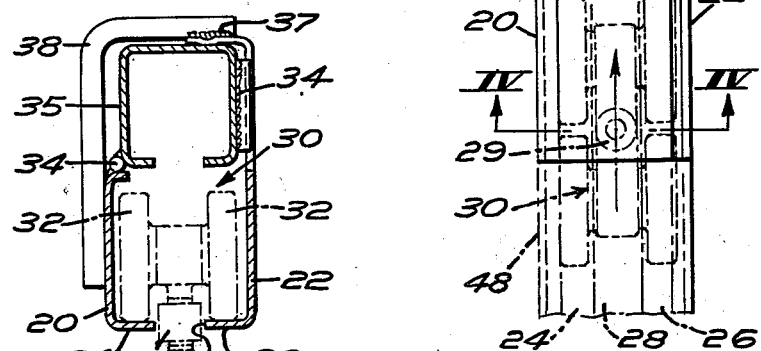
INVENTORS:
WILLIAM H. DEVONSHIRE,
ERFORD E. ROBINS and KENNETH D. SCHREYER
BY:
Beau, Brooke, Buckley & Beau,
ATTORNEYS.

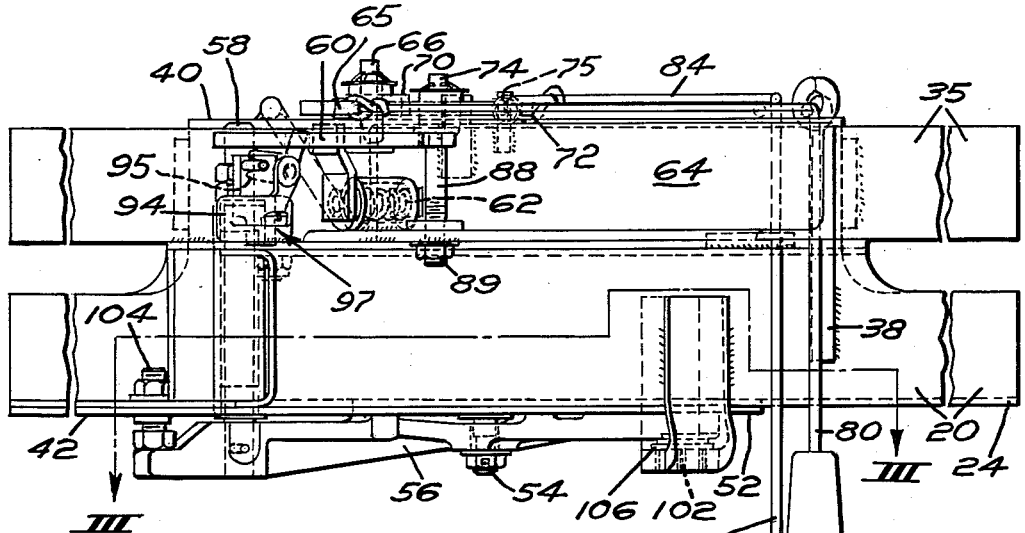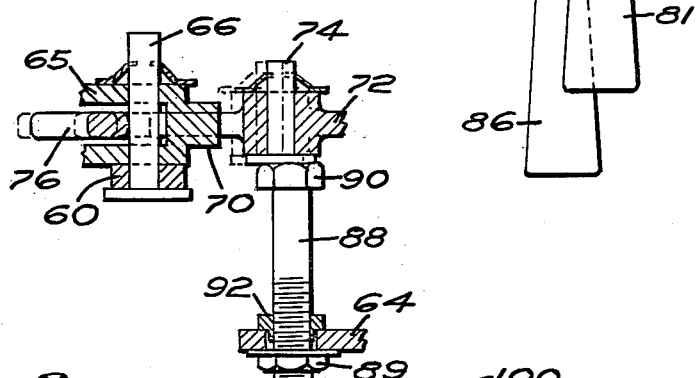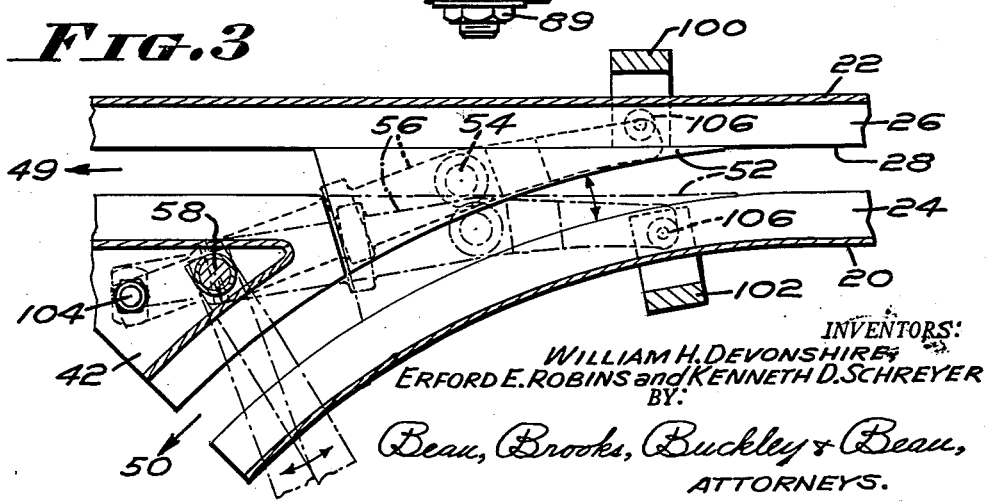

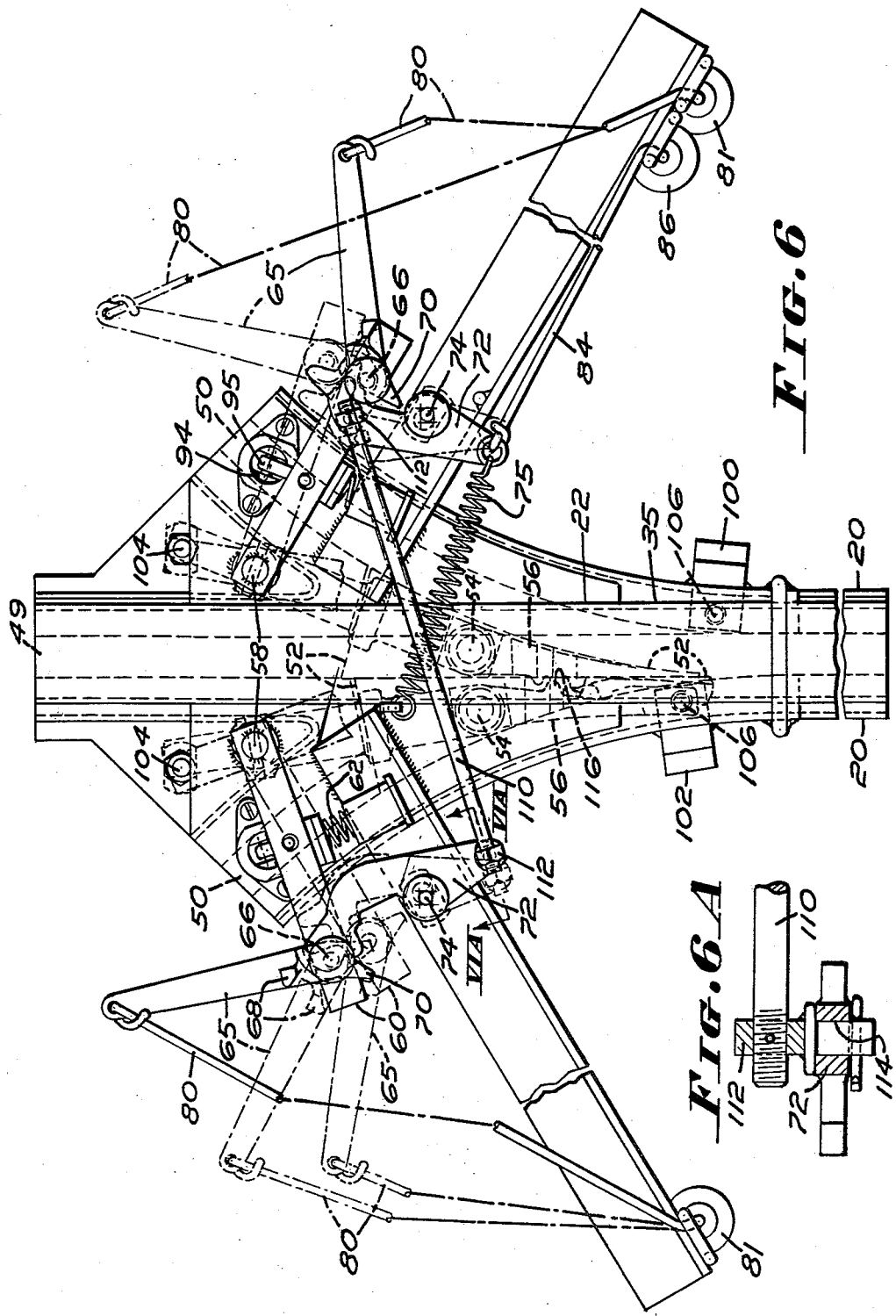

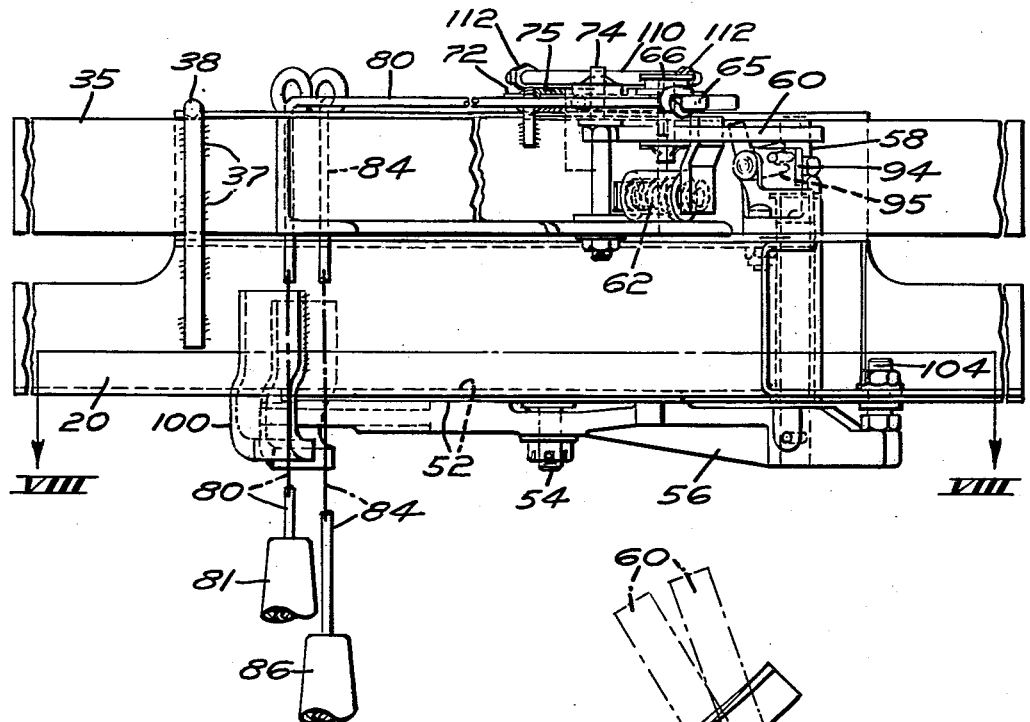
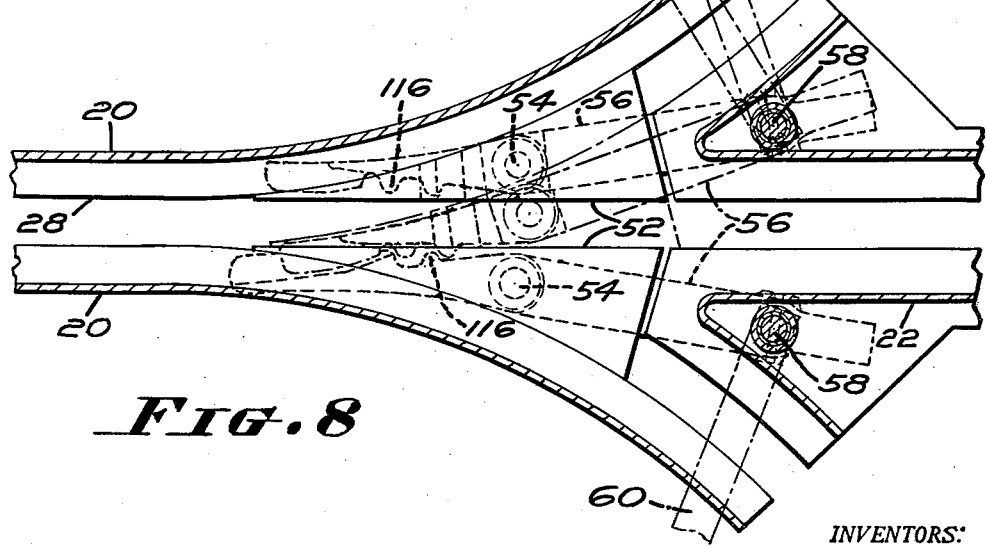

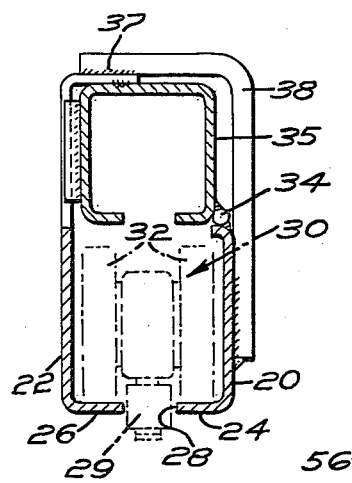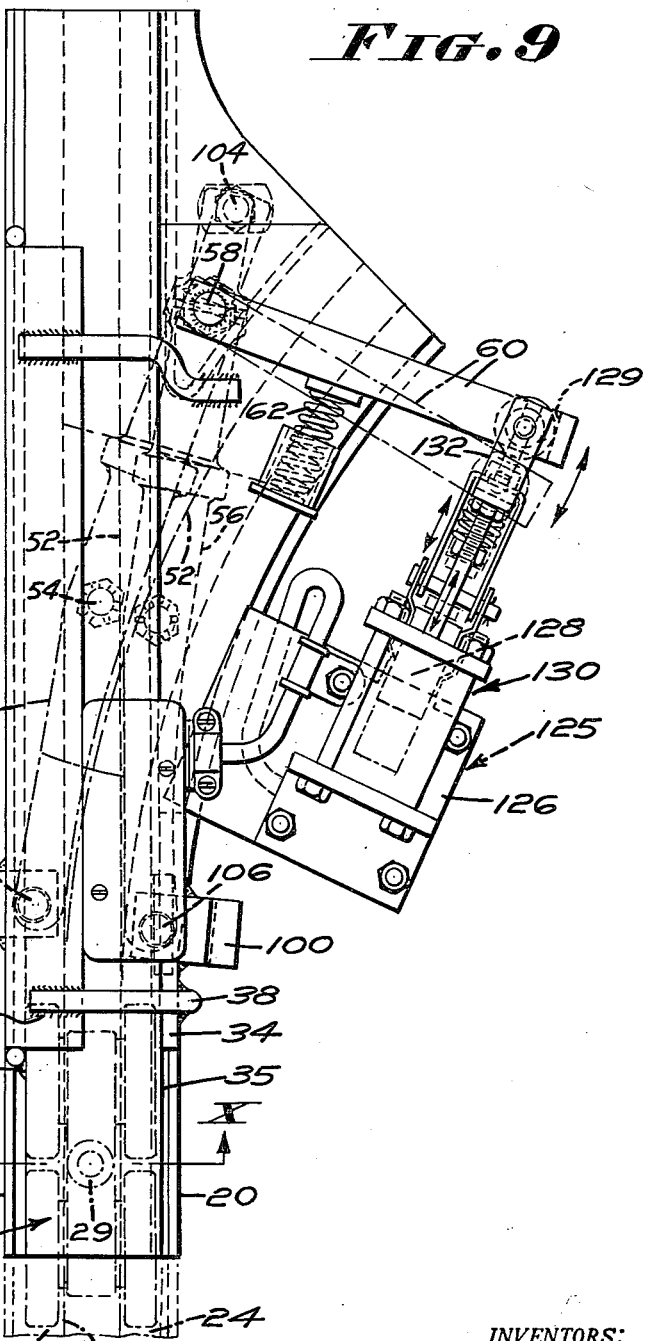

Nov. 20, 1962   W. H. DEVONSHIRE ETAL   3,064,586
TROLLEY CONVEYOR SWITCH MECHANISMS
Filed May 19, 1959   13 Sheets-Sheet 6

INVENTORS:
WILLIAM H. DEVONSHIRE,
ERFORD E. ROBINS and KENNETH D. SCHREYER
BY:
Beau, Brooks, Buckley & Beau,
ATTORNEYS.

Nov. 20, 1962 W. H. DEVONSHIRE ETAL 3,064,586
TROLLEY CONVEYOR SWITCH MECHANISMS
Filed May 19, 1959 13 Sheets-Sheet 7

INVENTORS:
WILLIAM H. DEVONSHIRE,
ERFORD E. ROBINS and KENNETH D. SCHREYER
BY:
Beau, Brooks, Buckley & Beau,
ATTORNEYS.

Nov. 20, 1962 W. H. DEVONSHIRE ETAL 3,064,586
TROLLEY CONVEYOR SWITCH MECHANISMS
Filed May 19, 1959 13 Sheets-Sheet 8

INVENTORS:
WILLIAM H. DEVONSHIRE,
ERFORD E. ROBINS and KENNETH D. SCHREYER
BY:
Beau, Brooks, Buckley & Beau,
ATTORNEYS.

Nov. 20, 1962 — W. H. DEVONSHIRE ETAL — 3,064,586
TROLLEY CONVEYOR SWITCH MECHANISMS
Filed May 19, 1959 — 13 Sheets-Sheet 9
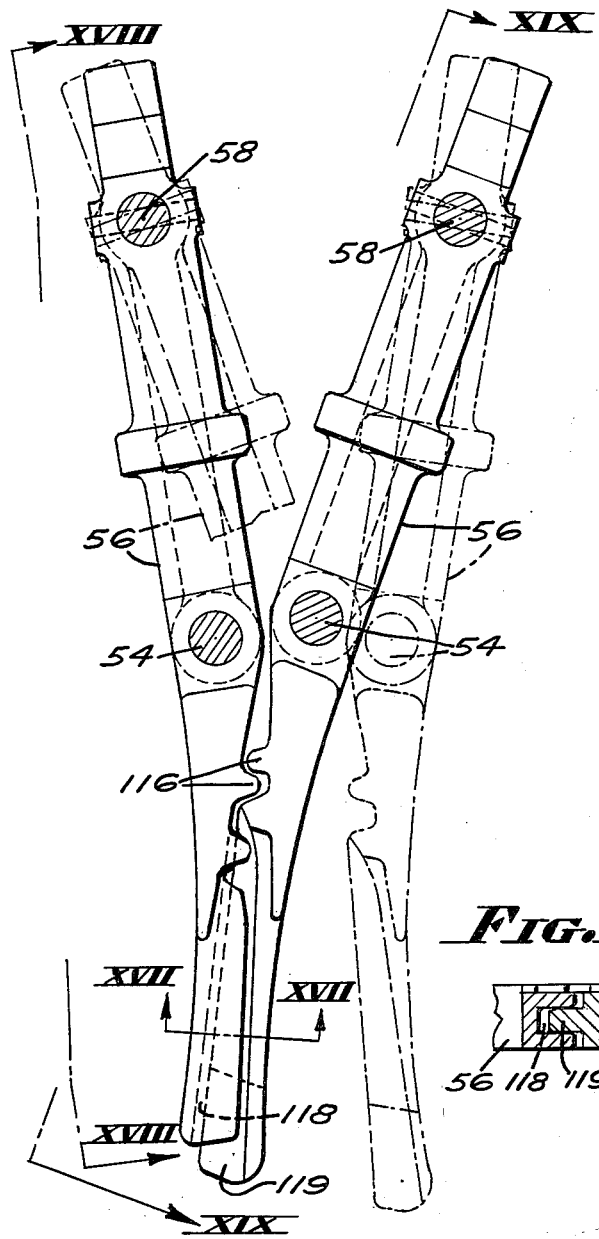
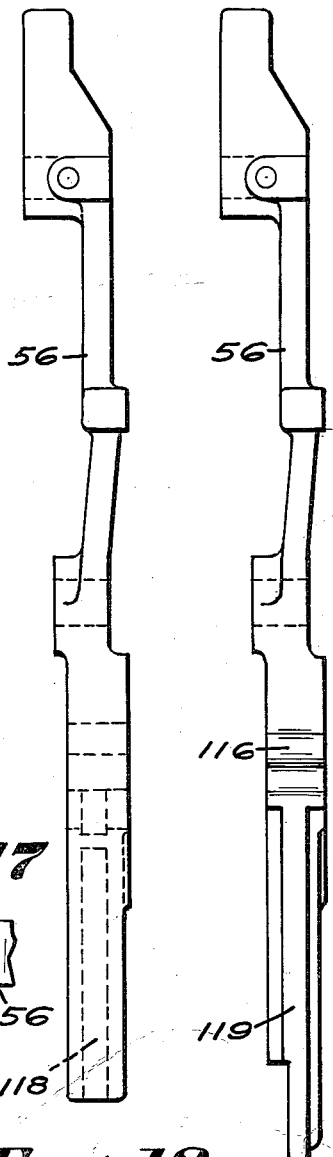
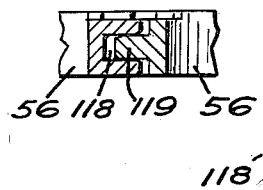
INVENTORS:
WILLIAM H. DEVONSHIRE,
ERFORD E. ROBINS and KENNETH D. SCHREYER
BY:
Beau, Brooks, Buckley & Beau,
ATTORNEYS.

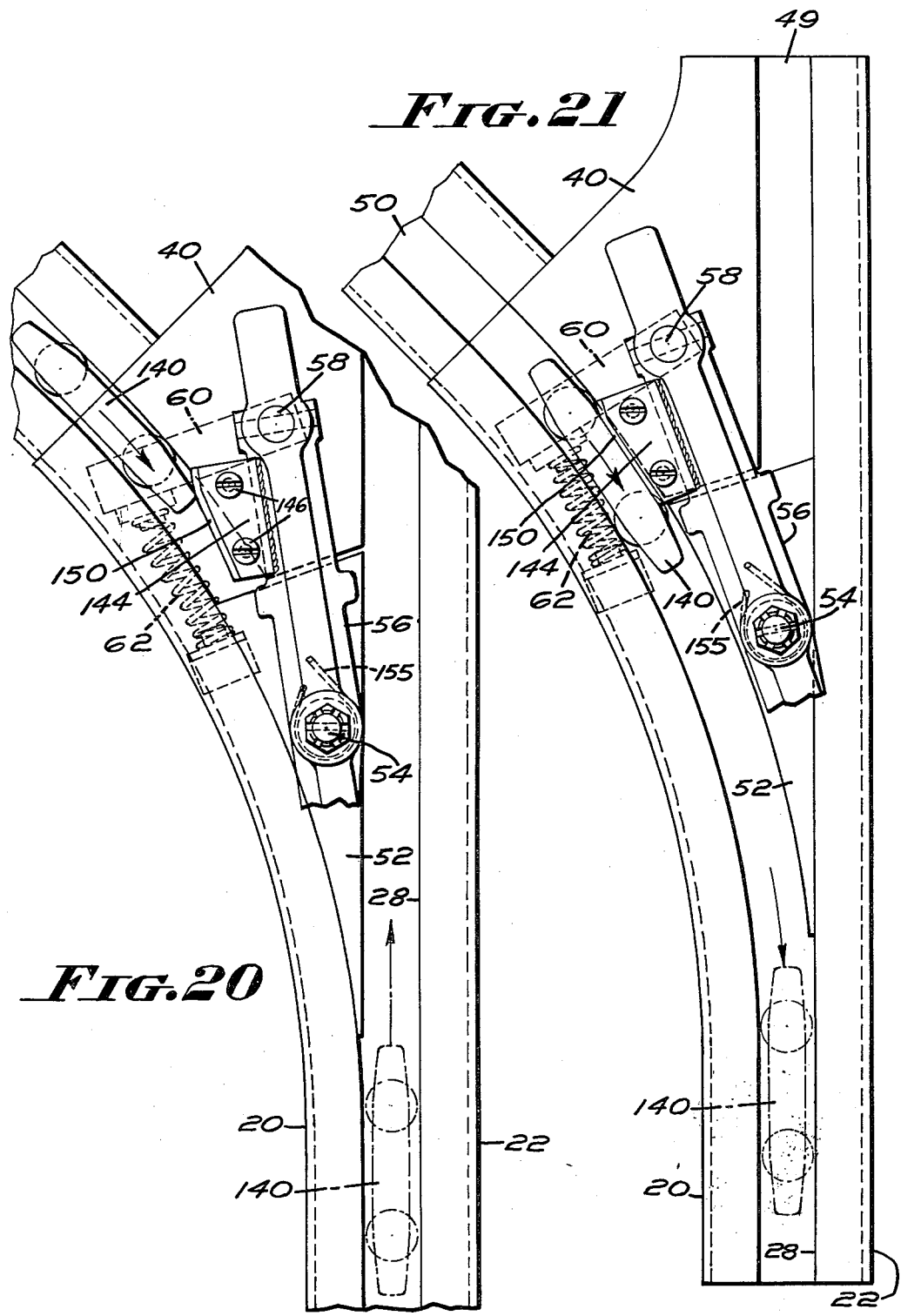

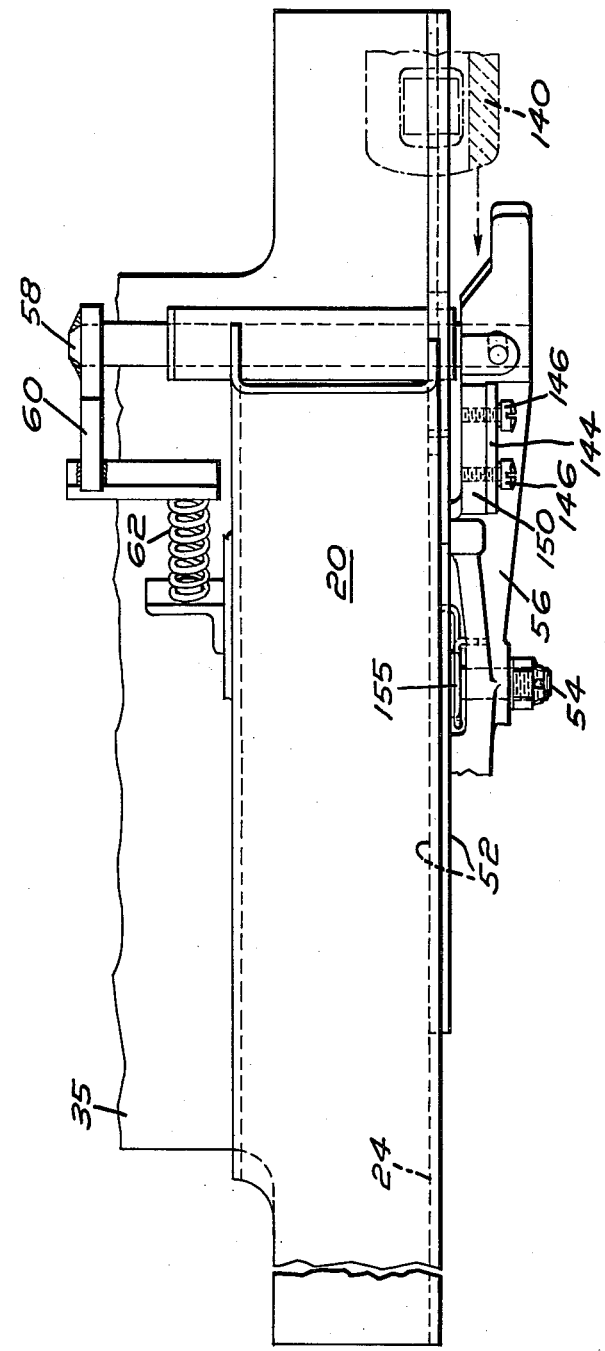

Nov. 20, 1962  W. H. DEVONSHIRE ETAL  3,064,586
TROLLEY CONVEYOR SWITCH MECHANISMS
Filed May 19, 1959  13 Sheets-Sheet 12
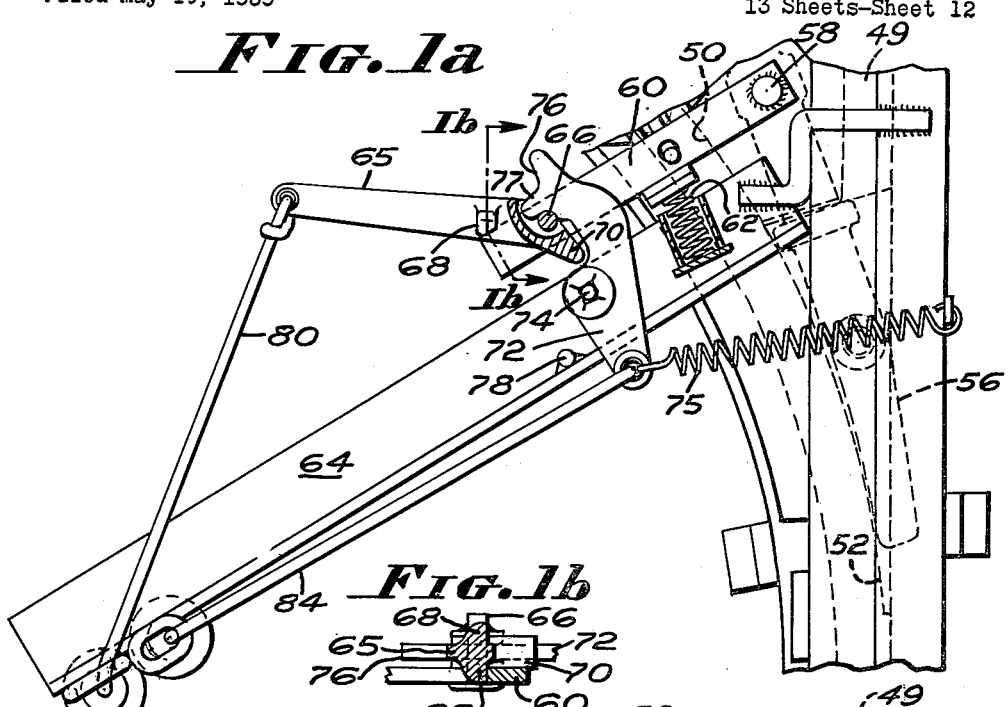
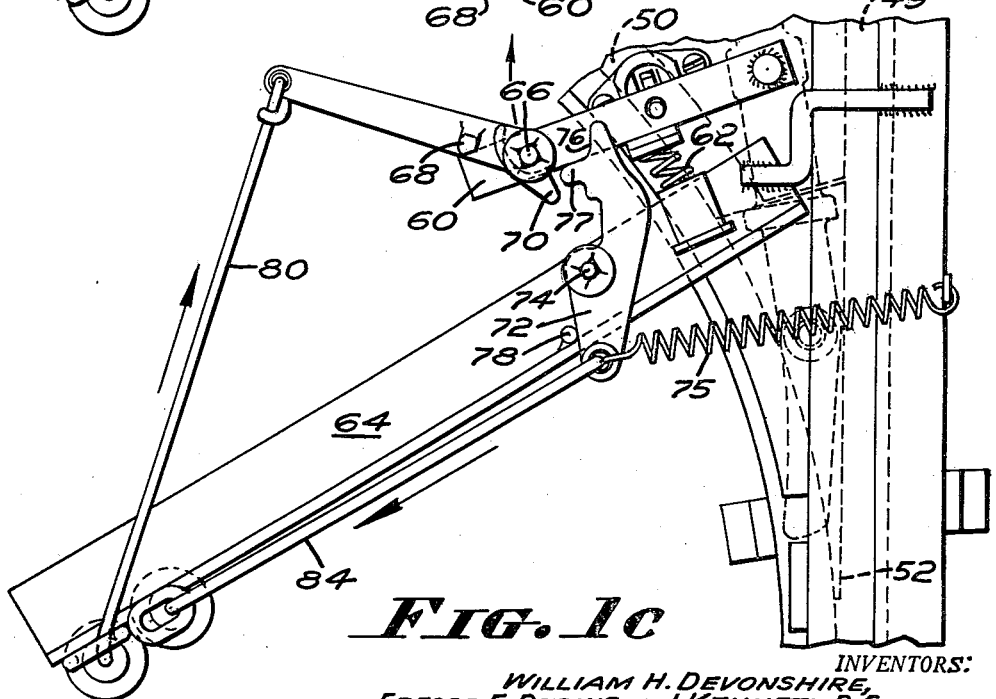
INVENTORS:
WILLIAM H. DEVONSHIRE,
ERFORD E. ROBINS and KENNETH D. SCHREYER
BY:
Beau, Brooks, Buckley & Beau,
ATTORNEYS.

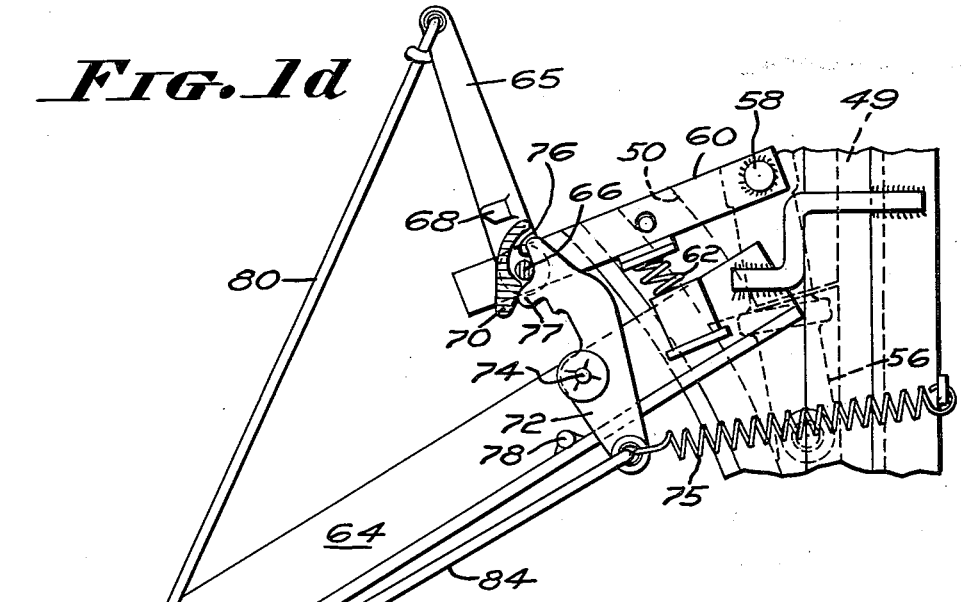
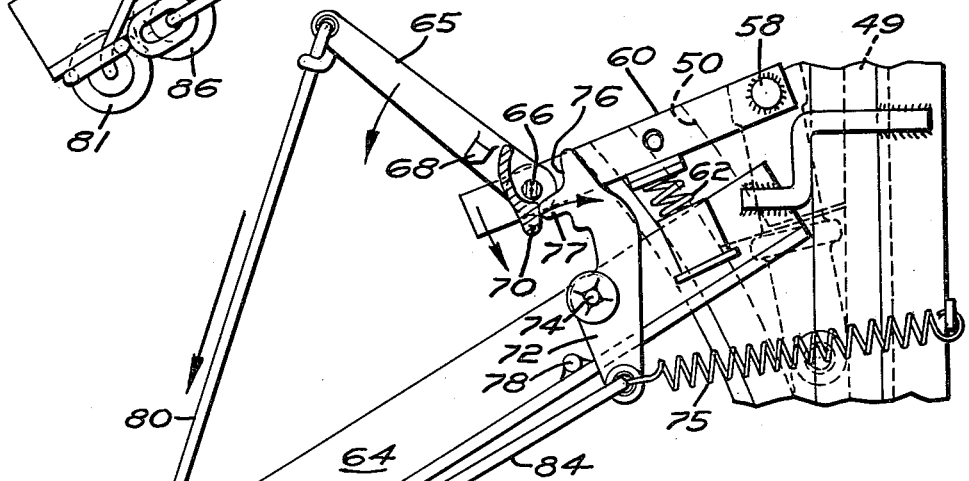

United States Patent Office 3,064,586
Patented Nov. 20, 1962

3,064,586
TROLLEY CONVEYOR SWITCH MECHANISMS
William H. Devonshire, Williamsville, Erford E. Robins, North Tonawanda, and Kenneth D. Schreyer, Williamsville, N.Y., assignors to Columbus McKinnon Corporation, Tonawanda, N.Y.
Filed May 19, 1959, Ser. No. 814,220
18 Claims. (Cl. 104—104)

This invention relates to trolley conveyors, and more particularly to trolley trackway switch devices.

One of the objects of the present invention is to provide in a trackway switch arrangement an improved switch wedge mounting and control device.

Another object of the invention is to provide in a switch as aforesaid an improved wedge motion control arrangement.

Still another object of the invention is to provide in a multiple branch switch device as aforesaid, employing switch wedges, an improved inter-related wedge motion control and interlock arrangement.

Other objects and advantages of this invention will appear in the specification hereinafter.

In the accompanying drawings:

FIG. 1 is a plan view of a two-way manually controlled form of the invention;

FIG. 1a is a view similar to the full line position of FIG. 1 with portions broken away for the sake of clarity;

FIG. 1b is a sectional view taken substantially along line 1b, 1b of FIG. 1a looking in the direction of the arrows;

FIG. 1c is a view of the components shown in FIG. 1a in a different relative position;

FIG. 1d is a view of the components shown in FIG. 1a in still another relative position of the components;

Figure 11:
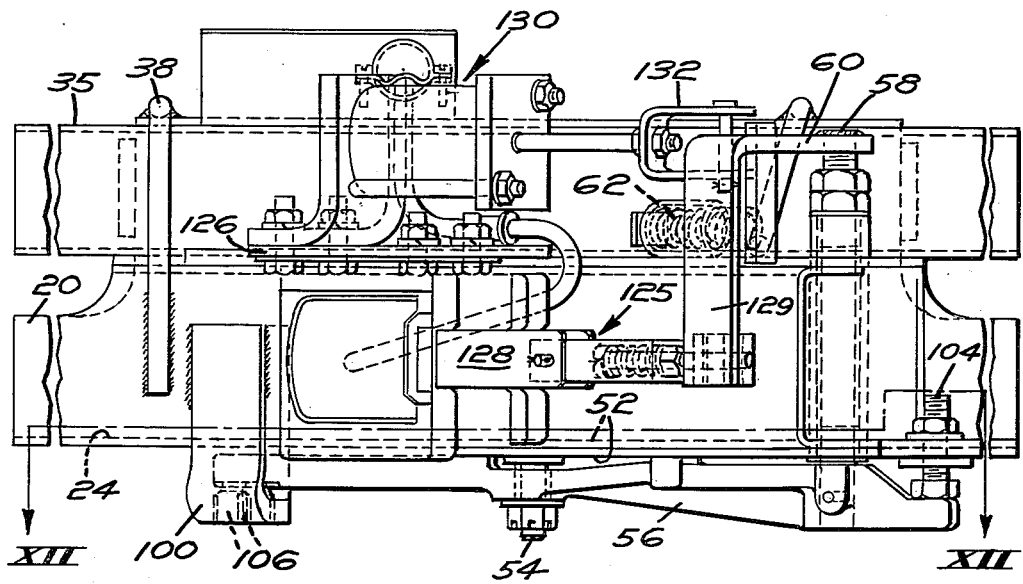
Figure 12:
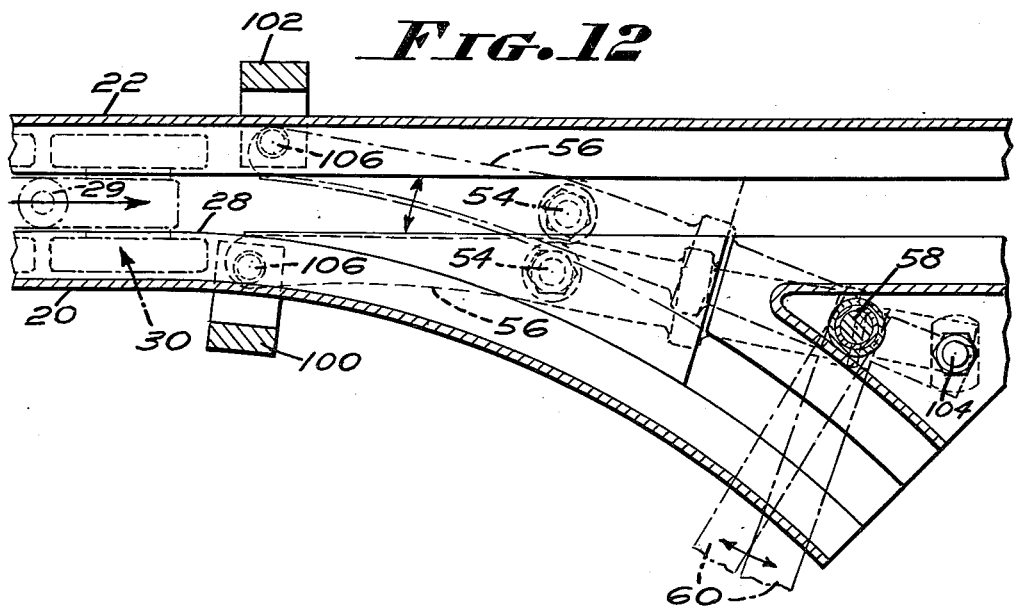
Figure 13:
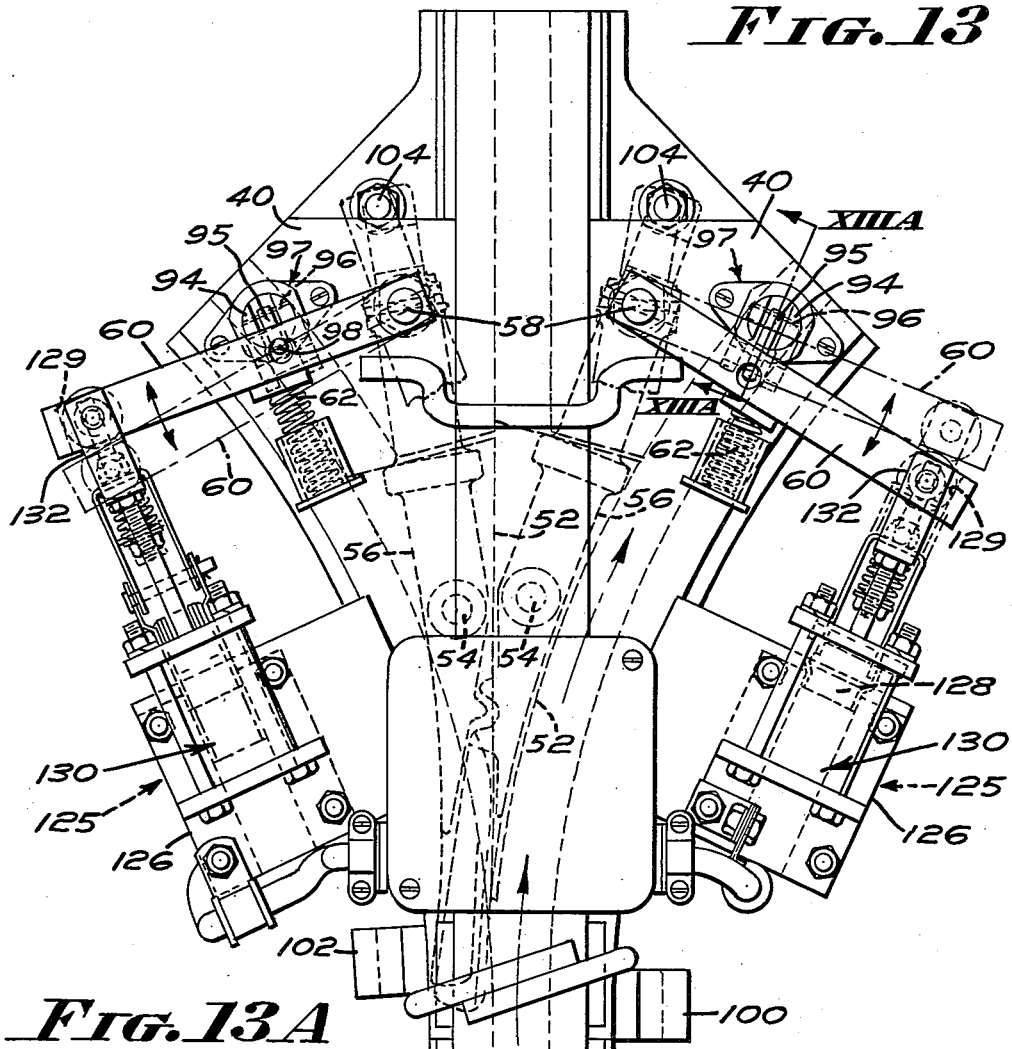
Figure 13A:
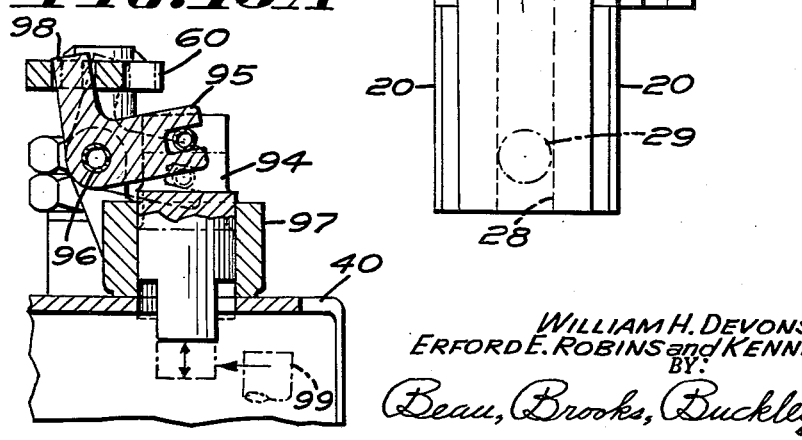
Figure 14:
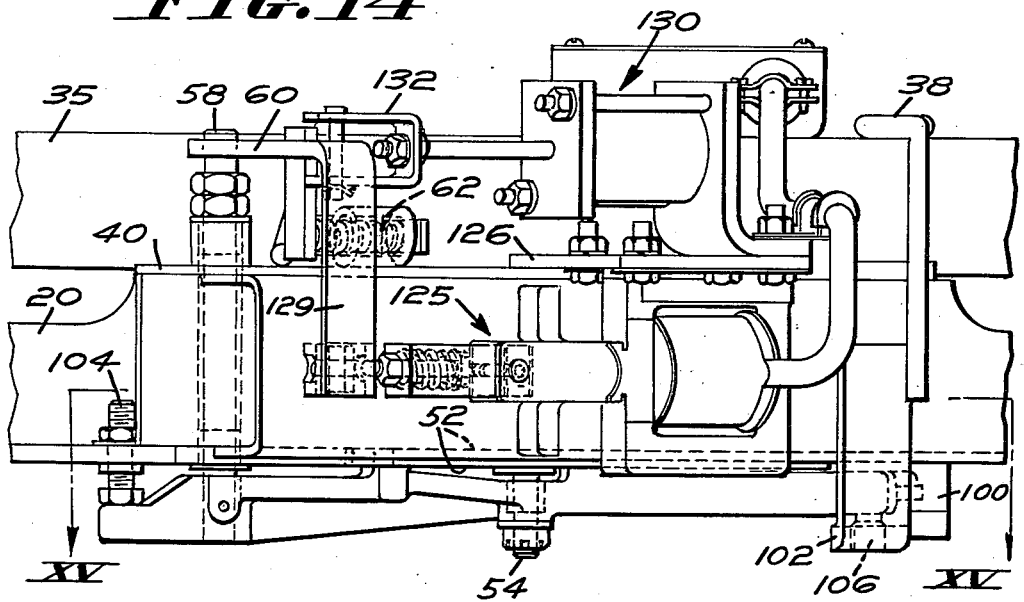
Figure 15:
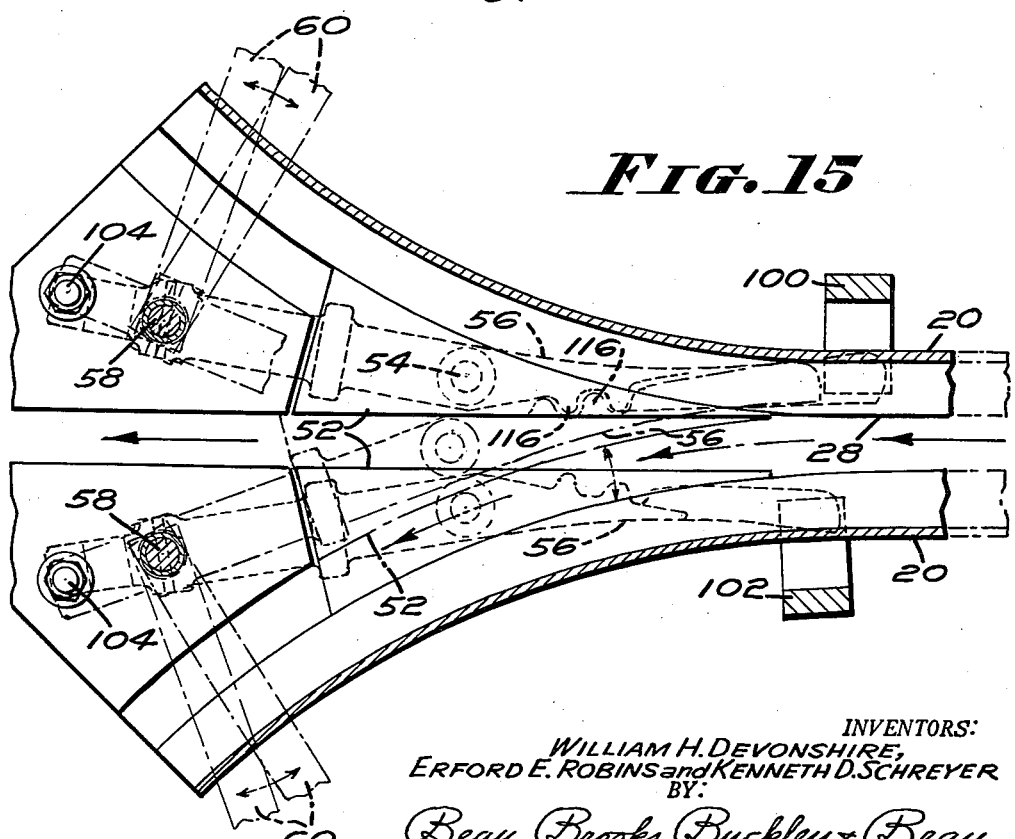

FIG. 1e also discloses the same components as shown in FIG. 1a in a further relative position thereof;

FIG. 2 is a side elevational view of the mechanism of FIG. 1;

FIG. 3 is a fragmentary section taken on line III—III of FIG. 2;

FIG. 4 is a fragmentary section taken on line IV—IV of FIG. 1;

FIG. 5 is a fragmentary section, on enlarged scale, taken on line V—V of FIG. 1;

FIG. 6 is a top plan view of a three-way manually controlled form of the switch apparatus, showing the right track in open position;

FIG. 6A is an enlarged section fragmentary view taken on line VIA—VIA of FIG. 6;

FIG. 7 is a side elevational view of the right hand side of the mechanism of FIG. 6;

FIG. 8 is a section taken on line VIII—VIII of FIG. 7, illustrating by solid lines adjustment to straight through running position and by broken lines adjustment of the mechanism to left hand branch open position;

FIG. 9 is a plan view of a two-way electric operated switch of the invention, showing by solid lines adjustment of the switch control to straightaway track open condition, and by broken lines adjustment of the mechanism to branch track open condition;

FIG. 10 is a sectional view taken on line X—X of FIG. 9;

FIG. 11 is a right hand side elevational view of the device of FIG. 9;

FIG. 12 is a horizontal section taken on line XII—XII of FIG. 11;

FIG. 13 is a plan view of a three-way electric operated switch of the invention, showing by solid lines the mechanism adjusted to right hand branch track open position;

FIG. 13A is a sectional view on enlarged scale taken on line XIIIA—XIIIA of FIG. 13, showing the safety stop mechanism for preventing trolleys coming in on the branch tracks from entering the switch when the switch is set against them;

FIG. 14 is a left hand side elevational view of the mechanism of FIG. 13;

FIG. 15 is a horizontal section taken on line XV—XV of FIG. 14;

FIG. 16 is a plan view of the wedge carrying arms of a mechanism such as shown in FIG. 6, illustrating positions of these elements under different switch adjustment conditions;

FIG. 17 is a fragmentary section taken on line XVII—XVII of FIG. 16;

FIGS. 18 and 19 are separate side elevational views of the wedge carrying arms of FIG. 16 taken along lines XVIII and XIX respectively of FIG. 16 looking in the direction of the arrows;

FIG. 20 is a bottom plan view of a two-way switch of the invention, embodying an improved wedge carrying arm camming arrangement and showing the switch set for straight-through travel;

FIG. 21 corresponds to FIG. 20 but shows the cam arrangement in action to permit inlet of a trolley from the branch track; and FIG. 22 is a side elevation of the mechanism of FIGS. 20, 21.

As shown in FIGS. 1–5 inclusive, the switch device of the present invention may be constructed to include a pair of oppositely disposed L-sectioned trolley track members designated 20, 22 having trolley rail portions 24, 26, respectively. The members 20, 22 are relatively mounted by any suitable means in such manner that the rail portions 24, 26 are spaced apart to provide therebetween a slot 28 through which pass the depending bracket portions 29 (FIG. 4) of trolleys such as are designated generally at 30. Thus, the trolley rollers 32—32 are arranged to run upon the rail portions 24, 26 and to suspend therebelow load carrying devices (not shown) which are attached to the suspension brackets 29. As shown in the drawing herewith, this mounting of the trackway members 20, 22 is effected by welding as indicated at 34—34, the upper portions of the trackway members 20, 22 to a generally box-sectioned power chain guideway 35. A reinforcing bracket 38 may also be welded to the unit as indicated at 37 (FIG. 4) to further relatively reinforce the trackway devices 20, 22 and 35.

As shown in FIG. 1, the trackway member 22 is longitudinally straight while the trackway member 20 is longitudinally curved, whereby the straight-section 22 is adapted to be coupled at its opposite ends to corresponding straight track sections of the system; while the curved end portion of the trackway member 20 is thus adapted to be coupled into a branch track portion of the system. To complete the switch configuration, at the divergent end of the switch device a top plate 40 and a bottom plate 42 are welded or otherwise permanently fixed to the members 20, 22 to span their plan view extents, and interiorly thereof wall devices 44, 46 are provided in opposed relation to the side wall portions of the members 20, 22, thus completing tunnel-like guiding channels for the trolley devices.

Thus, it will be appreciated that whereas the trolley devices may enter the switch device from a single straightaway track unit as indicated at 48 (FIG. 1), they may proceed through the switch device and exit therefrom either in the straightaway direction at the position designated 49, or in the direction of the branch track connection (not shown) at the position designated 50. To control the direction of passage of the trolley devices through the switch mechanism of the invention, a wedge member 52 as shown in FIG. 3, is provided and shaped in plan view so as to be adapted to be disposed interiorly of the switch and the intersecting trolley slot ways therein, in such manner that when the wedge is displaced to one side it will block the trolley slotway in that direction while completing the inner curvature of the other slotway and leaving it open for passage of trolley devices therethrough. Thus for example as shown in FIG. 3, the wedge 52 is set in position blocking the straightaway exit 49 while guiding the incoming trolleys to pass into the curved portion of the switch for exit at point 50. In broken lines, FIG. 3 illustrates the wedge 52 in opposite position, whereby the curved section of the switch is blocked off and the opened slotway 28 in straightaway direction for the exit 49 is opened.

To control displacement of the wedge 52 between its operative positions, it is pivotally mounted as indicated at 54 upon a wedge carrying arm 56 which is keyed to a vertical shaft 58 which is journaled in the switch housing. Thus the shaft 58 extends vertically through the switch mechanism and its upper end is keyed to a crank arm 60. Attention is called to the fact that the pivotal interconnection at 54 between the carrying arm 56 and the wedge 52 is disposed intermediately of the ends of the wedge device, whereby the wedge is free to rotate upon the pivotal connection 54. It will be appreciated that oscillative movements of the crank arm 60 will cause the carrying arm 56 to alternately displace the wedge 52 laterally in opposite directions interiorly of the switch device; whereupon the wedge will be sidewise displaced to proper positions accurately aligning the trolley slotway toward either exit 49 or 50. In either case the pointed end portion of the wedge 52 will bear alternately against opposite sides of the slotway 28 so as to pick up the incoming trolleys and guide them towards the appropriate exit. The rotatable mounting of the wedge on the carrying arm 56 enables the wedge to freely adjust and "float" into positions accurately aligning both the heel and the point of the wedge with the alternatively opened slotways.

The crank arm 60 is arranged to be normally biased by means of a compression spring 62 toward one direction of adjustment of the wedge; the spring 62 being arranged as illustrated herein to be mounted upon an angle bracket 64 and arranged to bias the crank arm to adjust the wedge into position to guide the trolleys toward the exit 49. A manual control linkage to the crank arm 60 is provided as shown in FIGS. 1, 2, 5 to comprise a lever 65 which is pivotally mounted as indicated at 66 upon the crank arm 60. The lever 65 includes a downwardly projecting finger 68 (FIG. 1) and the control arm 65 is bifurcated at its pivoted end portion to stabilize its bearing connection with the crank arm, and is provided with an extending end cam portion 70. A latch pawl 72 is pivotally mounted upon a vertical post 74 carried by the bracket 64, and one end of the pawl connects to a tension spring 75. At its other end the pawl 72 is formed with a concave dwell portion 76 and terminates in a nose 77. The parts are so arranged that when the switch is in its straightaway position the spring 62 is acting to hold the wedge in that position, and the spring 75 is acting to hold the pawl 72 in such position that the dwell portion 76 embraces the pin 66 in dead center relation, thus holding the device against accidental displacement.

When the control arm 65 is pulled upon, such as by means of a pull cord 80 having a manual handle 81, so as to rotate the arm in counterclockwise direction as viewed in FIG. 1, the cam portion 70 of the control arm is thereby moved to press against one end of the pawl 72 so as to pivot it to move in clockwise direction was viewed in FIG. 1, thereby releasing the pivot pin 66 from the dwell portion 76 thereof. Thus, the crank arm 60 is freed to also pivot in counterclockwise direction as viewed in FIG. 1, responsive to further pulling upon the control lever 65; whereby the control lever is displaced as from the broken line position thereof as shown in FIG. 1 to the solid line position thereof. Incidental thereto the crank arm 60 will be actuated by finger 68 so as to in turn cause the wedge to be moved over to close the straightaway slotway in the switch device and to thereby guide the incoming trolleys toward the exit 50.

As shown in FIG. 1, incidental to such adjustment of the mechanism, the free end of the pawl 72 hooks around the pin 66, as shown by the solid line disposition of the parts in FIG. 1, thereby latching the control system in this condition. To release the pawl for subsequent readjustment of the wedge so as to guide the incoming trolleys to the straightaway exit, a second pull cord 84 is connected to the end of the pawl 72 and is provided with a manual handle 86, whereupon downward pulling of the handle 86 will release the pawl 72 from the pin 66, whereupon the spring 62 goes into action to shift the control mechanism so that the wedge is disposed to close the branch portion of the switch device and to direct incoming trolleys toward the straightaway exit 49.

It is believed that a clearer understanding of the structure and intercooperation of the components above described will be gained from a perusal of FIGS. 1a, 1b, 1c, 1d and 1e. Referring firstly to FIG. 1a, this figure is the same as the full line position shown in FIG. 1, but with one end of member 65 broken away in order to show more clearly the locking relationship of the parts at that point, the cup-like holder for spring 62 being shown in section. To obtain the operating position shown, that is the wedge 52 shifted to a righthand position, the pull cord 80 is pulled down from the position shown in FIG. 1d or in FIG. 6 until wedge 52 assumes the desired position, at which time spring 75 pulls the pawl to the locked position shown in FIG. 1 and FIG. 1a wherein the ear or lug 77 engages pin 66, thereby locking upward movement of the arm 60 and thus locking the wedge against displacement.

FIG. 1b is taken along line 1b, 1b of FIG. 1a and illustrates the function of finger 68. This finger engages the end of arm 60 so as to move arm 60 downwardly upon further downward movement of arm 65.

FIGS. 1c and 1d show the manner in which wedge 52 is shifted to a left-hand position and how it is locked in that position. Cord 84 is pulled in the direction of the arrow as seen in FIG. 1c against the tension of spring 75 until lug 77 clears pin 66, thus unlocking arm 60 and allowing it to be pushed upwardly by spring 62 thereby moving the wedge to the desired position. Then, as shown in FIG. 1d, after arm 60 has been moved up by the spring 62 and the pull cord 84 released, spring 75 pulls pawl 72 into such position that the lug 77 of the pawl is directly below pin 66 thus preventing movement of the arm 60 in a downward direction and locking it in the position shown in FIG. 1d.

Referring now to FIG. 1e, pull cord 80 has been pulled in the direction of the arrow to unlock the device from the position shown in FIG. 1d, and to shift the wedge to the righthand position shown in FIG. 1a. As cord 80 is pulled in the direction of the arrow, member 70 cams lug 77 of pawl 72 away therefrom, thereby moving the lug 77 away from pin 66 sufficiently to unlock arm 60. After pin 66 clears lug 77, further pulling on cord 80 causes finger 68 on member 65 to engage the end of arm 60 and the arm 60 will be pulled downwardly against the force of spring 62 until it reaches the position shown in FIGS. 1 and 1a at which time spring 75 pivots the pawl 72 to move the lug 77 into the position shown in FIG. 1a which locks the arm 60 in the position shown therein.

To provide means for adjusting the pawl control action, the pivotal pin 74 is provided as an integral eccentrically offset extension of a post portion 88 (FIG. 5), the lower end of which is fixed for vertical adjustments to the supporting angle 64 as indicated at 89. A flatted wall portion 90 of the post 88 provides convenient means for gripping the latter with a tool and rotating the post 88 in its mounting, thereby causing the pin 74 to revolve about the center of rotation of the post 88. A lock nut 92 is provided to cooperate with the nut 89 to again fix the post in its adjusted position relative to the support angle 64.

As a safeguard against reverse passage of trolleys through the switch device a vertical plunger 94 is carried by the top plate 40, and is vertically positioned by means of a fork 95 (FIGS. 1 and 13A); the fork 95 being pivotally mounted as indicated at 96 upon a fixed housing 97 supported on the plate 40. The member 95 is of bell crank form and at its opposite end includes a finger portion 98 extending into an aperture formed in the crank arm 60. Thus, pivoting of the crank arm 60 as explained hereinabove will likewise cause the bell crank 95 to pivot so as to in turn displace the plunger 94 vertically, and the parts are so dimensioned and arranged that when the switch is adjusted to its straight away condition the lower end of the plunger 94 will be depressed into interfering position with portions 99 extending from the trolley devices of the system thereby preventing accidental backsliding movements of trolleys into the switch device. Thus it will also be appreciated that when the control mechanism is so set as to guide incoming trolleys to travel through the switch device in the direction of the exit 50, the plunger 94 will be automatically retracted upwardly so as to avoid interference with such travel of the trolleys.

As shown in FIGS. 2, 3, support devices for the wedge carrying arm 56 are provided at opposite ends thereof in the form of two brackets 100—102 arranged to underlie the moving end of the carrying arm so as to support it in its operative positions, and a pedestal bolt 104 disposed to overlie the opposite end of the carrying arm 56 so as to brace the arm against deflection in vertical directions responsive to the weight of the trolleys when running over the wedge device. As shown in FIG. 2, the pedestal bolt 104 is vertically adjustable in the frame so as to permit fine adjustments of the vertical attitude or position of the carrying arm 56, whereby the wedge 52 may in turn be accurately registered in alignment with the rail portions 24, 26 of the fixed structure. Similarly, the brackets 100, 102 include vertically adjustable pedestal devices as indicated at 106; and thus the arm 56 is firmly supported at 58, 100, 102 104, thereby assuring stabilizing of the arm 56 against rocking and proper horizontal alignments of the wedge with cooperating portions of the trackway structure.

As shown in FIGS. 6–8 the switch device of the invention may be arranged to provide a three-way switch by employing two mirror-image switch and control devices as described hereinabove placed opposite to one another on each side of the straightaway section of track. In such case, interrelating of the control linkage of the branch track section may be accomplished by providing a control rod 110 pivotally mounted at its ends to non-corresponding ends of the latch pawls 72, 72. As shown in FIG. 6A the pivot connections may be arranged by threading the ends of the rod 110 through first pins 112 which are journaled as indicated at 114 in suitably bored portions of the pawls. In this case only one tension spring 75 need be connected to one of the latch pawls 75, it then being operable to bias both latches into latching position.

As shown in FIGS. 6, 8, 16, 17, 18, 19 in this "three-way" version of the mechanism the wedge carrying arms 56—56 are preferably serrated as indicated at 116 in mutually complementing patterns so that when the arms are displaced together at either side of the mechanism, the serrations will intermesh and interlock the members. Also as shown in FIG. 17 the arms are relatively "tongue and grooved" as indicated at 118—119 to permit the members to telescope together for alignment purposes. Thus, when the two arms 56, 56 are pivoting into branch track open position they will be mutually braced and stabilized against displacement.

As shown in FIGS. 9–12 inclusive, a two-way switch arrangement of the present invention may be constructed as in accord with FIGS. 1–5, except that provision may be made for control of the crank arm 60 by means of a solenoid 125 mounted upon a bracket 126 extending from the switch body structure. The armature 128 of the solenoid is pivotally connected to the down-turned end portion 129 of the crank arm 60; and thus operation of the solenoid 125 will cause the crank arm to turn so as to cause the switch wedge to be displaced in the desired direction as explained hereinabove. Deenergization of the solenoid 125 will of course release the crank arm 60 so that it will thereupon return to its former position, in response to the action of the spring 62. Preferably, as shown in FIGS. 9, 11, a dash pot device as indicated at 130 will also be connected to the swinging end of the crank arm 60 such as by means of a bracket 132, whereby the movements of the switch wedge responsive to operation of the solenoid will be damped, to reduce the noise and impact forces on the switch parts whenever it is shifted, thus increasing the life of the apparatus.

FIGS. 13–15 inclusive illustrate application to the "three-way" version of the switch of an electrical control system, such as was explained hereinabove in connection with FIG. 9. In this case, the electrical control circuit (not shown) regulating operation of the paired solenoids will of course be so arranged as to insure non-interfering alternate operation of the solenoids, as is well known in the electrical art.

FIGS. 20–22 inclusive illustrate embodiment of an improved form of switch wedge cam device, whereby a trolley as indicated at 140 entering the switch mechanism from a branch track portion thereof may readily cam aside the wedge carrying arm 56 supporting the switch wedge which is biased by spring 62. In this case the wedge carrying arm 56 is provided with a laterally extending flange 144 to which is bolted as indicated at 146 a block of nylon or other suitable wear resistant material as indicated at 150; the outer face of the nylon block 150 extending beyond the bracket 144 so as to be disposed in registry with the path of a downwardly extending projection from the trolley 140 as it enters the switch from the branch trackway as shown in FIGS. 20, 21. The parts are so dimensioned and arranged that when the trolley first enters the switch mechanism as indicated in FIG. 20, the nose of the trolley portion 140 will slidingly bear and cam against the nylon block 150, whereby as the trolley continues to enter the switch the wedge carrying arm 56 will be progressively pivoted in counterclockwise direction such as to the position thereof shown in FIG. 21. This displacement of the carrying arm 56 moves the wedge 52 over against the opposite track so as to open the branch slotway through the switch mechanism just ahead of the incoming trolley, whereby the latter will thereupon be enabled to negotiate the switch mechanism and to gain to the main trackway portion of the system as indicated in the lower portion of FIG. 21.

The nylon block 150 is so located ahead of the wedge 52 that when the block is cammed aside by the incoming trolley it will operate to move the carrying arm away from branch closing position. A torsion spring 155 is mounted on the pivot 54 to bias the wedge 52 to rotate in clockwise direction when it is freed from pressure against the branch side of the trackway. Hence due to the fact that the wedge is otherwise "free floating" on its pivot axis 54 relative to the carrying arm 56, the camming aside action will operate first to cause the wedge to be released so that the spring 155 may swing the heel of the wedge out of the path of the incoming trolley, even though the wedge may not yet be cammed over into the fully "open" position.

Although only a few forms of the invention have been illustrated and described in detail hereinabove, it will be understood that various changes may be made therein without departing from the spirit of the invention or the scope of the following claims.

We claim:

1. A trolley trackway switch device including a frame having an inlet track portion having a slotted bottom defining oppositely disposed flat rail portions and a trolley trackway therebetween, a plurality of outlet trackway portions divergently related and each having a slotted bottom wall portion defining a pair of trolley support rail portions, the bottom rail portions of said switch device being interrupted interiorly thereof, a wedge plate shaped to complement the interrupted portions of said rail sections, a pivot device connected to said wedge plate intermediately of its ends and extending therefrom into pivotal connection with a wedge carrying arm, said carrying arm being in turn pivotally mounted upon said switch device at a position spaced from said pivot device, actuating means for swinging said carrying arm and thereby displacing said wedge plate alternatively to opposite sides of said switch device for guiding incoming trolleys to travel alternatively into different of said outlet portions, said actuating means comprising a vertical shaft keyed to said carrying arm and journalled in the switch frame, a crank arm keyed to said vertical shaft, a control arm pivoted to said crank arm and having a lost motion driving connection therewith, spring means biasing said crank arm in one direction, a latch pawl pivotally mounted upon said switch frame, and a spring device biasing said latch pawl towards dead center locking position relative to said crank arm, said control arm having cam means thereon whereby upon manual operation of said control arm the latter initially cams away and releases said latch pawl and then displaces said crank arm gainst the action of said spring means to cause said wedge to be laterally displaced to alternative switching positions.

2. A trolley trackway switch device including a frame having a straight through track portion having a slotted bottom defining oppositely disposed flat rail portions and a trolley slotway therebetween, a pair of branch trackway portions divergently-convergently related to said straight through portion and each having a slotted bottom wall portion defining a pair of trolley support rail portions, the bottom rail portions being interrupted interiorly thereof, a pair of wedge plates shaped to complement the interrupted portions of said rail sections, pivot devices connected to said wedge plates intermediately of their ends and extending therefrom into pivotal connectiions with wedge carrying arms, said carrying arms being in turn pivotally mounted upon said switch device at positions spaced from said pivot devices, actuating means for swinging said carrying arms and thereby displacing said wedge plates alternatively to opposite sides of said switch device for guiding trolleys to travel alternatively through different of said track portions, said actuating means comprising a vertical shaft keyed to each of said carrying arms and journaled in the switch frame, a crank arm keyed to each said vertical shaft, a control arm pivoted to each said crank arms and having a lost motion driving connection therewith, spring means biasing said crank arms in one direction, latch pawls pivotally mounted upon said switch frame, and spring devices biasing said latch pawls towards dead center locking positions relative to said crank arms, said control arms having cam means thereon whereby upon manual operation of said control arms the latter initially cam away and release said latch pawls and then displace said crank arms against the action of said spring means to cause said wedges to be laterally displaced to alternative switching positions.

3. A trolley trackway switch device including a frame having a main track portion having a slotted bottom defining oppositely disposed flat rail portions and a trolley slotway therebetween, a branch trackway portion also having a slotted bottom wall portion defining a pair of trolley support rail portions, the bottom rail portions being interrupted interiorly thereof, a wedge plate shaped to complement the interrupted portions of said rail sections, a pivot device connected to said wedge plate intermediately of its ends and extending therefrom into pivotal connection with a wedge carrying arm, said carrying arm being in turn pivotally mounted upon said switch device at a position spaced from said pivot device, an actuating lever for swinging said carrying arm and thereby displacing said wedge plate alternatively to opposite sides of said switch device for guiding trolleys to travel alternatively through different portions of the switch, a control arm pivoted to said lever and having a lost motion driving connection therewith, spring means biasing said lever in one direction, a latch pawl biased towards locking position relative to said lever, said control arm having cam means thereon whereby upon manual operation of said control arm the latter initially cams away and releases said latch pawl and then displaces said lever against the action of said spring means to cause said wedge to be laterally displaced to alternative switching positions.

4. A trolley trackway switch device including a frame having a straight through track portion and a pair of branch trackway portions divergently-convergently related to said straight through portion, a pair of wedge plates shaped to complement intersecting forms of said straight through and branch trackways, pivot devices connected to said wedge plates intermediately of their ends and extending therefrom into pivotal connections with wedge carrying arms, said carrying arms being in turn pivotally mounted upon said switch device at positions spaced from said pivot devices, actuating means for swinging said carrying arms and thereby displacing said wedge plates alternatively to opposite sides of said switch device for guiding trolleys to travel alternatively through different of said track portions, opposed sides of said arms being shaped to intermesh when set to guide trolleys through branch trackways.

5. A trolley trackway switch device including a frame having a straight through track portion and a branch trackway portion divergently-convergently related to said straight through portion, a wedge plate shaped to complement interrupted portions of said trackway sections, a pivot device connected to said wedge plate intermediately of its ends and extending therefrom into pivotal connection with a wedge carrying arm, said carrying arm being in turn pivotally mounted upon said switch device at a position spaced from said pivot device, means biasing said carrying arm in one direction, said carrying arm having a cam surface in the path of trolleys approaching said wedge plate whereby an approaching trolley will cam said carrying arm aside and cause said wedge plate to move into position to allow passage of said trolley.

6. A trolley trackway switch device including a frame having a main track portion having a slotted bottom defining oppositely disposed flat rail portions and a trolley slotway therebetween, a branch trackway portion also having a slotted bottom wall portion defining a pair of trolley support rail portions, the bottom rail portions being interrupted interiorly thereof, a wedge plate shaped to complement the interrupted portions of said rail sections, a pivot device connected to said wedge plate intermediately of its ends and extending therefrom into pivotal connection with a wedge carrying arm, said carrying arm being in turn pivotally mounted upon said switch device at a position spaced from said pivot device, an actuating lever for swinging said carrying arm and thereby displacing said wedge plate alternatively to opposite sides of said switch device for guiding trolleys to travel alternatively through different portions of the switch, said wedge plate having opposite side edges alternately engageable with said trackway portions in the different positions thereof as effected by said actuating means and carrying arm, whereby the edge not thus engaged and forming a trackway continuation is fully braced to prevent loading of either the carrying arm or actuating means, spring means biasing said lever in one direction, and motor means coupled to said lever for actuating the device.

7. A trolley trackway switch device including a frame having a straight through track portion having a slotted bottom defining oppositely disposed flat rail portions and a trolley slotway therebetween, a pair of branch trackway portions divergently-convergently related to said straight through portion and each having a slotted bottom wall portion defining a pair of trolley support rail portions, the bottom rail portions of said trackways being interrupted interiorly thereof, a pair of wedge plates shaped to complement the interrupted portions of said rail sections, pivot devices connected to said wedge plates intermediately of their ends and extending therefrom into pivotal connections with wedge carrying arms, said carrying arms being in turn pivotally mounted upon said switch device at positions spaced from said pivot devices, actuating means for swinging said carrying arms and thereby displacing said wedge plates alternatively to opposite sides of said switch device for guiding trolleys to travel alternatively through different of said track portions, said actuating means comprising a vertical shaft keyed to each of said carrying arms and journalled in the switch frame, a crank arm keyed to each said vertical shaft, a control arm pivoted to each said crank arms and having a lost motion driving connection therewith, spring means biasing said crank arms in one direction, latch pawls pivotally mounted upon said switch frame, a spring device biasing one of said latch pawls towards dead center locking position relative to its crank arm, a tie rod interconnecting said latch pawls to cause them to operate in unison, said control arms having cam means thereon whereby upon manual operation of said control arms the latter initially cam away and release said latch pawls and then displace said crank arms against the action of said spring means to cause said wedges to be laterally displaced to alternative switching positions.

8. A trolley trackway switch device including a frame having a straight through track portion and a branch trackway portion divergently-convergently related to said straight through portion, a wedge plate shaped to complement interrupted portions of said trackway sections, a pivot device connected to said wedge plate intermediately of its ends and extending therefrom into pivotal connection with a wedge carrying arm, said carrying arm being in turn pivotally mounted upon said switch device at a position spaced from said pivot device, means biasing said carrying arm in one direction, separate means biasing said wedge to rotate relative to said carrying arm in the same direction, said carrying arm having a cam surface in the path of trolleys approaching said wedge plate whereby an approaching trolley will cam said carrying arm aside and cause said wedge plate to move into position to allow passage of said trolleys.

9. A trolley trackway switch device including a frame supporting a main track portion having a slotted bottom defining oppositely disposed flat rail portions and a trolley slotway therebetween, a branch trackway portion also having a slotted bottom wall portion defining a pair of trolley support rail portions, the bottom rail portions of said main track being interrupted interiorly thereof, a switch wedge shaped to complement the interrupted portions of said rail sections, a pivot device connected to said wedge intermediately of its ends and extending therefrom into pivotal connection with a wedge carrying arm intermediately of its ends, said carrying arm being in turn pivotally mounted upon said switch device at a position spaced from said pivot device, an actuating lever for swinging said carrying arm and thereby displacing said wedge alternatively to opposite sides of said switch device for guiding trolleys to travel alternatively through different portions of the switch, and fixed abutment means carried by said frame to bear vertically against the opposite ends of said wedge carrying arm when in its different positions of wedge adjustment to stabilize said arm and said wedge against positional deflections.

10. A trolley trackway switch device including a frame having a plurality of trackway portions divergently related, a wedge, a pivot device connected to said wedge intermediately of its ends and extending therefrom into pivotal connection with a wedge carrying arm, said carrying arm being in turn pivotally mounted intermediately of its ends upon said switch device at a position spaced from said pivot device, actuating means for swinging said carrying arm and thereby displacing said wedge plate alternatively to opposite sides of said switch device for guiding trolleys to travel alternatively through different trackway portions, said wedge plate being freely rotatable on its pivotal connection with said carrying arm to "float" into trackway conforming positions, and vertically adjustable support means slidably receiving the opposite ends of said arm to positionally stabilize the latter in any position of its adjustment.

11. A trolley trackway switch device including a frame having a plurality of trackway portions divergently related, a wedge plate, a pivot device connected to said wedge plate intermediately of its ends and extending therefrom into pivotal connection with a wedge carrying arm, said carrying arm being in turn pivotally mounted upon said switch device, actuating means for swinging said carrying arm and thereby displacing said wedge plate alternately to opposite sides of the switch device for guiding trolleys to travel alternately through different trackway portions, said actuating means including resilient means normally urging said carrying arm in one direction, latching means for holding said carrying arm in other of its positions, and latch release means for permitting restoration of said carrying arm from its other position to the position thereof into which it is normally urged by said resilient means.

12. The assembly as defined in claim 11 in which the latch means and latch release means are manually actuated.

13. The assembly as defined in claim 11 wherein a crank arm is fixed to said carrying arm, said latch means including a crank pivotally mounted on said switch device, a pin on said crank arm engageable with one end of said crank to be held thereby in opposition to said resilient means.

14. The assembly as defined in claim 13 wherein said latch release means includes a lever pivotally mounted upon said crank arm and rotatable relative thereto, said lever having cam means thereon engageable with said crank to cam the same out of latching position, said lever also having a finger engageable with said crank arm after limited relative rotation therebetween whereby said lever effects a rigid continuation of the crank arm for movement thereof.

15. A trolley trackway switch device including a frame having a straight through trackway portion and a branch trackway portion divergently-convergently related to said straight through portion, a wedge plate shaped to complement interrupted portions of said trackway portions, a carrying arm pivotally mounted on said switch device, means pivotally connecting said wedge plate to said carrying arm whereby the wedge plate is freely rotatable relative thereto, a lever rigidly fixed to said carrying arm and projecting laterally therefrom beyond the confines of said switch device so as to be positioned for accessibility outside the switch device, and means mounted on said switch device and connected to said lever for moving the same to effect corresponding movement of said carrying arm and translation of said wedge plate relative to said trackway portions so as to divert a trolley running in said straight through track portions either through the branch trackway portion or in a continuing fashion along the straight through track portion.

16. A trolley trackway switch device including a frame having a straight through track portion and a branch track portion connected thereto, said frame including top and bottom plates fixed to said track portions at their junction, a shaft rotatably received in said plates and projecting therethrough, a carrying arm fixed to one end of said shaft adjacent to but exteriorly of one of said plates and a crank arm fixed to the other end of said shaft adjacent to but exteriorly of the other of said plates, a wedge plate pivotally mounted on said carrying arm remote from said shaft and being translationally movable by the carrying arm for disposition in either one of the other of said track portions, spring means carried by said frame and engaging said crank arm to normally urge the same to effect movement of said wedge plate into one of its positions, and actuating means connected to said crank arm effective to move the same in opposition to said spring means to translate said wedge plate to the other of its positions.

17. The assembly as defined in claim 16 wherein said actuating means includes a latching mechanism for holding said crank arm in that position opposed to said spring means, and latch release mechanism for permitting movement of said crank arm into that position in which it is normally urged by said spring means.

18. A trolley conveyor trackway switch device including
    frame structure having at least a pair of trackway portions disposed in diverging relationship relative to each other,
    each of said trackway portions having inner and outer side portions disposed in spaced relationship relative to each other to define a slotway therebetween,
    said trackway portions being interrupted along a region of intersection with the inner side portions thereof being discontinuous thereat and the respective outer side portions thereof converging to define a part of the respective trackway portion,
    an elongated wedge plate disposed in the region of intersection of the trackway portions,
    a wedge carrying arm pivotally connected to said wedge plate intermediate the end portions thereof and extending therefrom into pivotal connection with the switch device at a location remote from the pivotal connection of the wedge plate and the carrying arm,
    said wedge plate being freely rotatable about the pivotal connection with said carrying arm to enable the wedge plate to "float" into positions conforming with the trackway portions with said wedge plate when disposed in a selected one of the trackway portion conforming positions having one side edge portion thereof bearing along the outer side portion of one trackway portion while the other side edge portion of the wedge plate forms the inner side portion of the other trackway portion substantially continuously throughout the entire discontinuity thereof to enable trolleys to be guided through the switch device and along selected ones of the trackway portions, and
    actuating means connected to and for swinging said wedge carrying arm to urge said wedge plate to opposite sides of the switch device.

References Cited in the file of this patent

UNITED STATES PATENTS

| | | |
|---|---|---|
| 541,366 | Langen | June 18, 1895 |
| 784,037 | Cundall | Mar. 7, 1905 |
| 1,443,382 | Rapier | Jan. 30, 1923 |
| 1,917,837 | Haddlesay | July 11, 1933 |
| 2,840,005 | Henderson et al. | June 24, 1958 |
| 2,840,006 | Henderson | June 24, 1958 |

FOREIGN PATENTS

| | | |
|---|---|---|
| 203,330 | Australia | Sept. 13, 1956 |